United States Patent
Jang et al.

(10) Patent No.: US 12,308,169 B2
(45) Date of Patent: May 20, 2025

(54) MULTILAYER CERAMIC ELECTRONIC COMPONENT

(71) Applicant: SAMSUNG ELECTRO-MECHANICS CO., LTD., Suwon-si (KR)

(72) Inventors: Eun Yong Jang, Suwon-si (KR); Seung Yeon Lee, Suwon-si (KR); Eun Chae Park, Suwon-si (KR); Byung Chul Jang, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 209 days.

(21) Appl. No.: 18/093,963

(22) Filed: Jan. 6, 2023

(65) Prior Publication Data

US 2023/0274884 A1  Aug. 31, 2023

(30) Foreign Application Priority Data

Feb. 25, 2022  (KR) ..................... 10-2022-0025075

(51) Int. Cl.
*H01G 4/008* (2006.01)
*H01G 4/232* (2006.01)
*H01G 4/248* (2006.01)
*H01G 4/30* (2006.01)

(52) U.S. Cl.
CPC ........... *H01G 4/0085* (2013.01); *H01G 4/232* (2013.01); *H01G 4/248* (2013.01); *H01G 4/30* (2013.01)

(58) Field of Classification Search
CPC ........ H01G 4/30; H01G 4/0085; H01G 4/248; H01G 4/12; H01G 11/46
See application file for complete search history.

(56) References Cited

U.S. PATENT DOCUMENTS

| 6,343,002 | B1 | 1/2002 | Shimizu et al. |
| 10,515,762 | B2* | 12/2019 | Makino ................. H01G 4/232 |
| 2013/0009516 | A1 | 1/2013 | Kim et al. |

(Continued)

FOREIGN PATENT DOCUMENTS

| JP | H08-186059 A | 7/1996 |
| JP | 2002-198252 A | 7/2002 |

(Continued)

OTHER PUBLICATIONS

Japanese Office Action dated Apr. 2, 2024 issued in Japanese Patent Application No. 2023-005019 (with English translation).

(Continued)

*Primary Examiner* — David M Sinclair
*Assistant Examiner* — Kaemon Eli Watada
(74) *Attorney, Agent, or Firm* — Morgan Lewis & Bockius LLP

(57) ABSTRACT

A multilayer ceramic electronic component includes a body including a dielectric layer and a plurality of internal electrodes stacked with the dielectric layer interposed therebetween, the plurality of internal electrodes including indium (In) and tin (Sn), and an external electrode disposed on an outside of the body. An average content of indium (In) included in the internal electrode is higher than an average content of tin (Sn) included in the internal electrode.

19 Claims, 8 Drawing Sheets

(56) References Cited

U.S. PATENT DOCUMENTS

| | | | |
|---|---|---|---|
| 2013/0082575 A1* | 4/2013 | Kang | H10N 30/871 336/200 |
| 2015/0380160 A1 | 12/2015 | Kim et al. | |
| 2016/0155571 A1 | 6/2016 | Doi et al. | |
| 2017/0022608 A1 | 1/2017 | King et al. | |
| 2017/0084392 A1 | 3/2017 | An et al. | |
| 2017/0271083 A1 | 9/2017 | Makino et al. | |
| 2019/0304695 A1 | 10/2019 | Kim et al. | |
| 2020/0058442 A1* | 2/2020 | Cha | H01G 4/12 |
| 2022/0341024 A1* | 10/2022 | Yamada | B32B 7/025 |

FOREIGN PATENT DOCUMENTS

| | | |
|---|---|---|
| JP | 2002-270458 A | 9/2002 |
| JP | 2012-256647 A | 12/2012 |
| JP | 2013-16454 A | 1/2013 |
| JP | 2013-080903 A | 5/2013 |
| JP | 2016-196606 A | 11/2016 |
| JP | 2017-519349 A | 7/2017 |
| JP | 2017-168746 A | 9/2017 |
| JP | 2019-176117 A | 10/2019 |
| KR | 10-0379205 B1 | 4/2003 |
| KR | 10-2013-0036596 A | 4/2013 |
| KR | 10-2186145 B1 | 12/2020 |
| WO | 2015/016309 A1 | 2/2015 |
| WO | 2020/090415 A1 | 5/2020 |

OTHER PUBLICATIONS

Japanese Office Action dated Dec. 26, 2023 issued in Japanese Patent Application No. 2023-005019 (with English translation).

* cited by examiner

MULTILAYER CERAMIC ELECTRONIC COMPONENT

CROSS-REFERENCE TO RELATED APPLICATION(S)

This application claims benefit of priority to Korean Patent Application No. 10-2022-0025075 filed on Feb. 25, 2022 in the Korean Intellectual Property Office, the disclosure of which is incorporated herein by reference in its entirety.

TECHNICAL FIELD

The present disclosure relates to a multilayer ceramic electronic component.

BACKGROUND

A multilayer ceramic capacitor (MLCC), a type of multilayer electronic component, may be a chip-type capacitor mounted on the printed circuit boards of various electronic products such as imaging devices including liquid crystal displays (LCDs) and plasma display panels (PDPs), computers, smartphones, mobile phones, and the like, serving to charge or discharge electricity therein or therefrom. Such multilayer ceramic capacitors may be used as components of various electronic devices due to small size, high capacitance, and ease of mounting.

Recently, as electric vehicles and autonomous vehicles have been developed in the automobile industry, a larger number of multilayer ceramic capacitors have been required. For example, in the case of an electric vehicle, 10,000 or more multilayer ceramic capacitors are required, and in the case of an autonomous vehicle, 12,000 to 15,000 multilayer ceramic capacitors are required.

That is, as the electric system in an automobile has improved in performance, a high-capacitance multilayer ceramic capacitor is required. In addition, since multilayer ceramic capacitors used in automobiles need to be stably operated for a longtime in a high temperature environment of 150° C. or higher, such as an engine and a transmission, it is required to ensure high-temperature reliability. Accordingly, there is a need for research into a multilayer ceramic capacitor having high capacitance and excellent high-temperature reliability.

SUMMARY

An aspect of the present disclosure provides a multilayer ceramic electronic component having excellent high-temperature reliability.

An aspect of the present disclosure provides a multilayer ceramic electronic component having excellent insulation resistance.

However, the aspects of the present disclosure are not limited to the above description, and will be more easily understood in the process of describing specific example embodiments of the present disclosure.

According to an aspect of the present disclosure, there is provided a multilayer ceramic electronic component including a body having a dielectric layer and internal electrodes stacked with the dielectric layer interposed therebetween, the internal electrodes including indium (In) and tin (Sn), and an external electrode disposed on an outside of the body. An average content of indium (In) included in at least one of the internal electrodes may be higher than an average content of tin (Sn) included in the at least one of the internal electrodes.

According to another aspect of the present disclosure, there is provided a multilayer ceramic electronic component including a body having a dielectric layer and internal electrodes stacked with the dielectric layer interposed therebetween, the internal electrodes including indium (In) and tin (Sn), and an external electrode disposed on an outside of the body. A content of indium (In) in a first region of at least one of the internal electrodes may be higher than an average content of indium (In) in a second region of the at least one of the internal electrodes, where the first region is within 2 nm of an interface with the dielectric layer in a thickness direction thereof, and the second region is a region other than the region of the internal electrode within 2 nm of the interface with the dielectric layer in the thickness direction thereof. A content of tin (Sn) in the first region may be higher than an average content of tin (Sn) in the second region.

According to example embodiments of the present disclosure, a multilayer ceramic electronic component may have excellent high-temperature reliability.

According to example embodiments of the present disclosure, a multilayer ceramic electronic component may have excellent insulation resistance.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
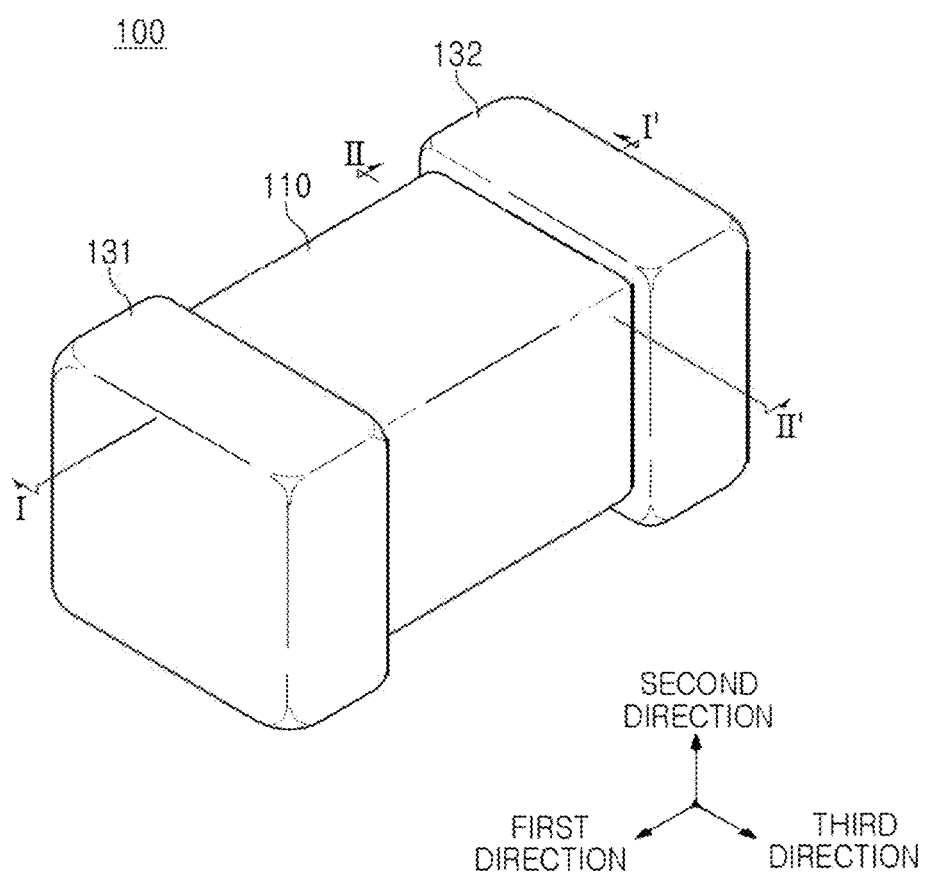
FIG. 1 is a schematic perspective view illustrating a multilayer ceramic electronic component according to an example embodiment of the present disclosure.

Hereinafter, example embodiments of the present disclosure will be described as follows with reference to the accompanying drawings. The present disclosure may, however, be exemplified in many different forms and should not be construed as being limited to the specific example embodiments set forth herein. In addition, example embodiments of the present disclosure may be provided for a more complete description of the present disclosure to those skilled in the art. Accordingly, the shapes and sizes of the elements in the drawings may be exaggerated for clarity of description, and the elements denoted by the same reference numerals in the drawings may be the same elements.

In order to clearly illustrate the present disclosure, portions not related to the description are omitted, and sizes and thicknesses are magnified in order to clearly represent layers and regions, and similar portions having the same functions within the same scope are denoted by similar reference numerals throughout the specification. Throughout the specification, when an element is referred to as "comprising" or "including," it means that it may include other elements as well, rather than excluding other elements, unless specifically stated otherwise.

In the drawings, a first direction may be defined as a length (L) direction, a second direction may be defined as a thickness (T) direction, and a third direction may be defined as a width (W) direction.

FIG. 1 is a schematic perspective view illustrating a multilayer ceramic electronic component according to an example embodiment of the present disclosure.

Figure 2:
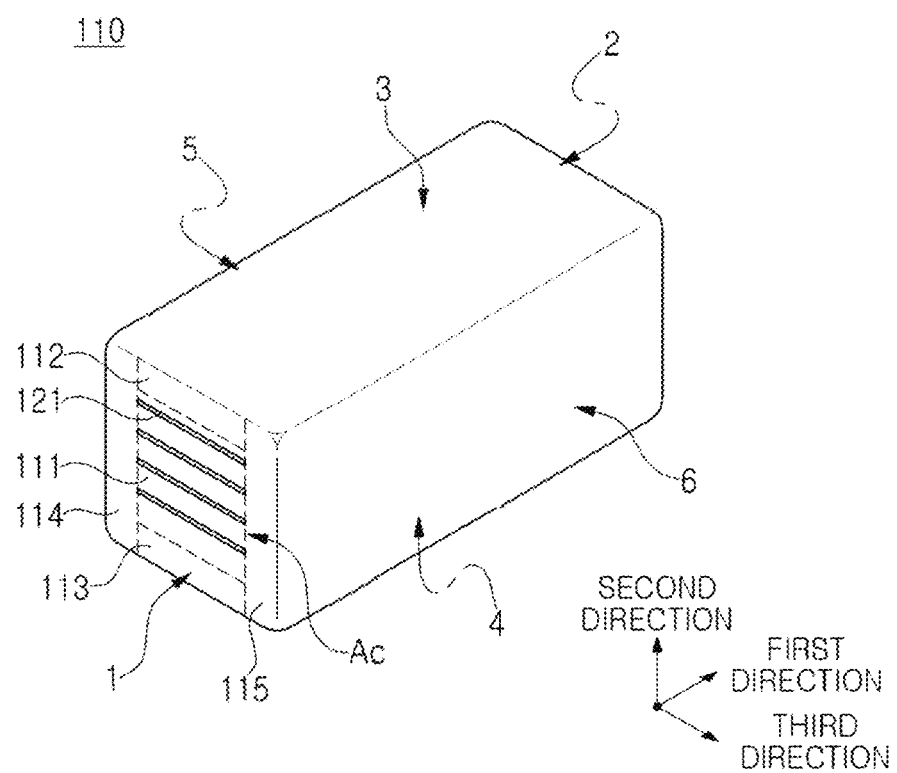
FIG. 2 is a schematic perspective view illustrating a body of a multilayer ceramic electronic component.

FIG. 2 is a schematic perspective view illustrating a body of a multilayer ceramic electronic component.

Figure 3:
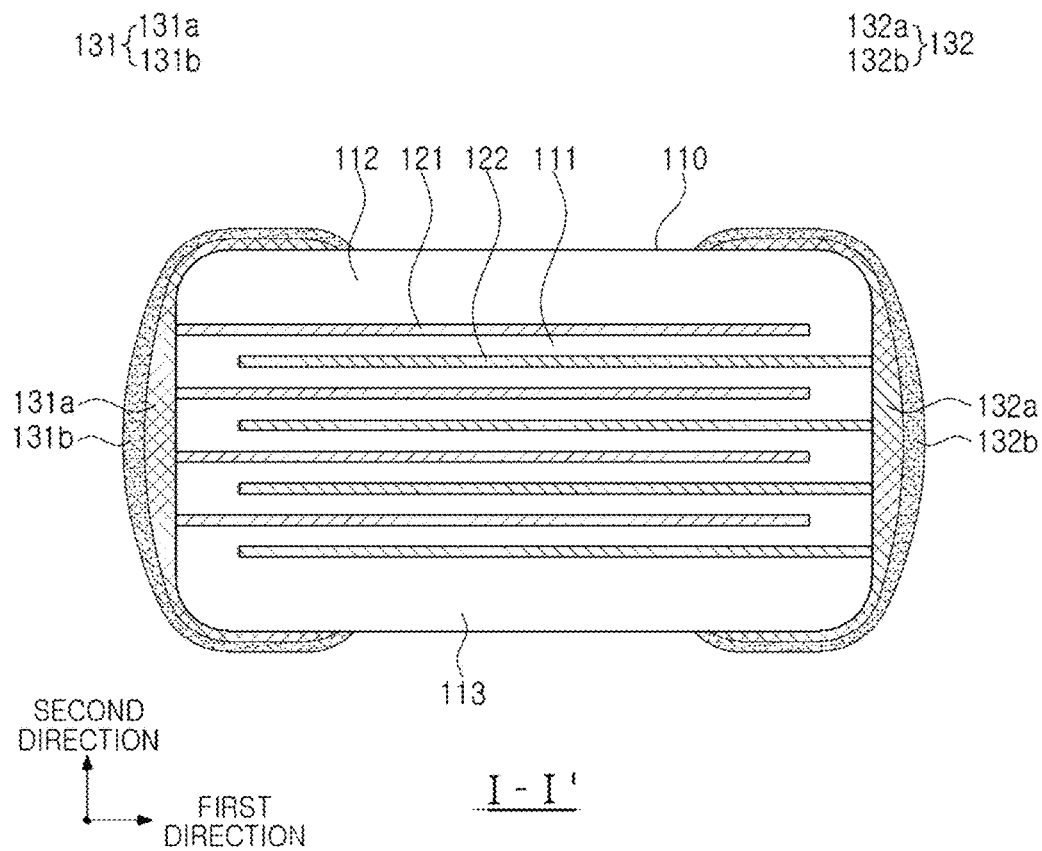
FIG. 3 is a schematic cross-sectional view illustrating a cross-section I-I' of FIG. 1.

FIG. 3 is a schematic cross-sectional view illustrating a cross-section I-I' of FIG. 1.

Figure 4:
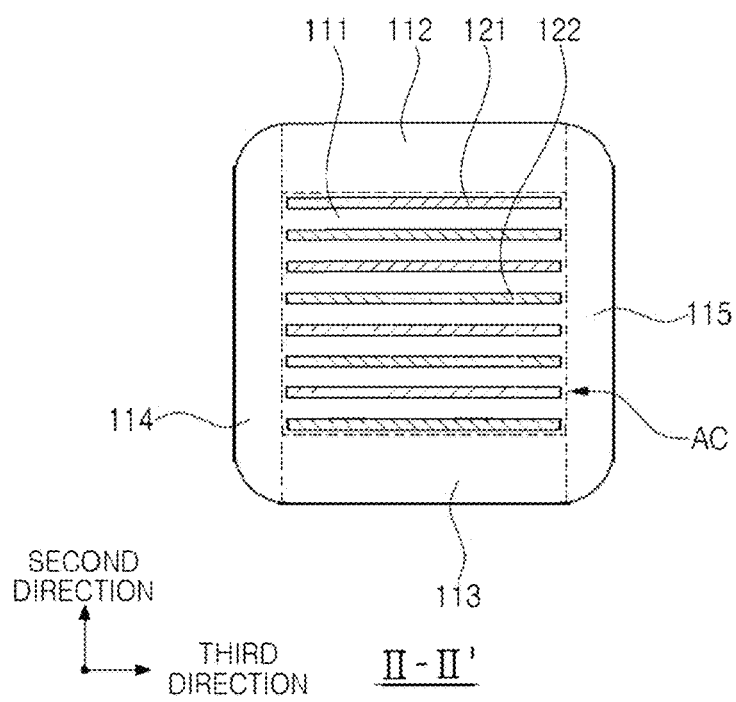
FIG. 4 is a schematic cross-sectional view illustrating a cross-section II-II' of FIG. 1.

FIG. 4 is a schematic cross-sectional view illustrating a cross-section II-II' of FIG. 1.

Referring to FIGS. 1 to 4, a multilayer ceramic electronic component 100 according to an example embodiment of the present disclosure may include a body 110 including a dielectric layer 111 and a plurality of internal electrodes 121 and 122 stacked with the dielectric layer 111 interposed therebetween, and external electrodes 131 and 132 disposed an outside of the body 110.

A specific shape of the body 110 is not particularly limited. However, as illustrated, the body 110 may have a hexahedral shape or a shape similar thereto. The body 110 may have first and second surfaces 1 and 2 opposing in a first direction, third and fourth surfaces 3 and 4 connected to the first and second surfaces 1 and 2 and opposing in a second direction, and fifth and sixth surfaces 5 and 6 connected to the first to fourth surfaces 1, 2, 3, and 4 and opposing in a third direction.

In the body 110, the dielectric layer 111 and the internal electrodes 121 and 122 may be alternately stacked. A plurality of dielectric layers 111 forming the body 110 may be in a sintered state, and the adjacent dielectric layers 111 may be integrated with each other so that boundaries therebetween may not be readily apparent without using a scanning electron microscope (SEM).

The dielectric layer 111 may be formed by sintering a ceramic green sheet including ceramic powder, an organic solvent, and a binder. The ceramic powder is not particularly limited as long as sufficient capacitance is obtainable therewith. For example, a barium titanate ($BaTiO_3$) material, a strontium titanate ($SrTiO_3$)-based material, or the like may be used, but the present disclosure is not limited thereto.

In this case, an average thickness of the dielectric layer 111 may be 10 μm or less in consideration of a size and capacitance of the body 110, and may be 0.6 μm or less for miniaturization and implementation of high capacitance of the multilayer ceramic electronic component 100, more preferably 0.4 μm or less, but the present disclosure is not limited thereto. The average thickness of the dielectric layer 111 may be measured by scanning a cross-section of the body 110 cut in the first direction and the second direction with an SEM at a magnification of 10,000. More specifically, at multiple points of the one dielectric layer 111, for example, at 30 points equally spaced apart from each other in the first direction, the thickness thereof may be measured to measure an average value. In addition, when such average value measurement is performed on the plurality of dielectric layers 111, the average thickness of the dielectric layer 111 may be further generalized. Other methods and/or tools appreciated by one of ordinary skill in the art, even if not described in the present disclosure, may also be used.

The body 110 may include a capacitance formation portion Ac in which a capacitance is formed by including a plurality of first internal electrodes 121 and a plurality of second internal electrodes 122 disposed in the body 110 and disposed to oppose each other with the dielectric layer 111 interposed therebetween, a first cover portion 112 formed on an upper portion of the capacitance formation portion Ac, and a second cover portion 113 formed on a lower portion of the capacitance formation portion Ac.

The first cover portion 112 and the second cover portion 113 may be formed by respectively stacking a single dielectric layer or two or more dielectric layers on upper and lower surfaces of the capacitance formation portion Ac in the second direction, and may basically serve to prevent damage to an internal electrode caused by physical or chemical stress. The first and second cover portions 112 and 113 may have the same configuration as that of the dielectric layer 111, except that the first and second cover portions 112 and 113 do not include an internal electrode. An average thickness of each of the first and second cover portions 112 and 113 may be 20 μm or less, but the present disclosure is not limited thereto. A thickness of each of the cover portions 112 and 113 may refer to a length of each of the cover portions 112 and 113 in the second direction, and may refer to an average value of thicknesses measured at 30 points spaced apart from each other in the first direction in a cross-section of the body 110 cut in the first direction and the second direction.

The body 110 may further include margin portions 114 and 115 disposed on a side surface of the capacitance formation portion Ac with respect to the third direction. The margin portions 114 and 115 may include a first margin portion 114 disposed on a fifth surface 5 of the body 110 and a second margin portion 115 disposed on a sixth surface 6 of the body 110. The margin portions 114 and 115 may refer to a region between opposite ends of the internal electrodes 121 and 122 and a boundary of the body 110 in a cross-section of the body 110 cut in the second direction and the third direction. The margin portions 114 and 115 may basically serve to prevent damage to an internal electrode caused by physical or chemical stress. The margin portions 114 and 115 may include a material the same as or different from that of the dielectric layer 111.

The margin portions 114 and 115 may be formed by coating a conductive paste on a ceramic green sheet, except a portion where a margin portion is to be formed, so as to form an internal electrode. Alternatively, the internal electrodes 121 and 122 may be cut to be exposed to the fifth and sixth surfaces 5 and 6 of the body 110, and then a single dielectric layer or two or more dielectric layers may be stacked on opposite side surfaces of the capacitance formation portion A in the third direction, thereby forming the margin portions 114 and 115. An average thickness of each of the margin portions 114 and 115 may be 20 μm or less, but the present disclosure is not limited thereto. A thickness of each of the margin portions 114 and 115 may refer to a length of each of the margin portions 114 and 115 in the third direction, and may refer to an average value of thicknesses measured at 30 points spaced apart from each other in the second direction in a cross-section of the body 110 cut in the second direction and the third direction.

The internal electrodes 121 and 122 may be alternately disposed with the dielectric layer 111, and the plurality of first internal electrodes 121 and the plurality of second internal electrodes 122 may oppose each other with the dielectric layer 111 interposed therebetween. The plurality of first internal electrodes 121 and the plurality of second internal electrodes 122 may be formed to be alternately exposed through the first and second surfaces 1 and 2 of the body 110 in a stacking direction of the dielectric layer 111.

For example, each of the plurality of first internal electrodes 121 may be spaced apart from the second surface 2, and may be exposed through the first surface 1. In addition, each of the plurality of second internal electrodes 122 may be spaced apart from the first surface 1, and may be exposed through the second surface 2. The plurality of first internal electrodes 121 and the plurality of second internal electrodes 122 may be electrically isolated from each other by the dielectric layer 111 interposed therebetween.

A conductive metal included in the internal electrodes 121 and 122 may include one or more of indium (In), tin (Sn), nickel (Ni), copper (Cu), palladium (Pd), silver (Ag), gold (Au), platinum (Pt), tungsten (W), titanium (Ti), and an alloy thereof, and more preferably, indium (In) and tin (Sn). In addition, based on the metals present in the internal electrodes 121 and 122, the internal electrodes 121 and 122 may include a highest percentage (at %) of nickel (Ni).

In some embodiments, an average content of nickel (Ni) included in the internal electrodes 121 and 122 may be higher than the average content of indium (In) included in the internal electrodes 121 and 122. In some embodiments, an average content of nickel (Ni) included in the internal electrodes 121 and 122 may be higher than the average content of tin (Sn) included in the internal electrodes 121 and 122.

The average content of nickel (Ni) may be measured similarly to the average contents of indium (In) and tin (Sn) as disclosed herein. For example, the average content of nickel (Ni) may refer to an average value measured by measuring contents of nickel (Ni) of the internal electrodes 121 and 122 at five points evenly spaced apart from each other in a thickness direction of the internal electrodes 121 and 122 in a cross-section of the body 110 cut in the first direction and the second direction or a cross-section of the body 100 cut in the second direction and third direction. The contents of nickel (Ni) may be measured through a TEM-EDS line profile. Other methods and/or tools appreciated by one of ordinary skill in the art, even if not described in the present disclosure, may also be used.

An average thickness of each of the internal electrodes 121 and 122 may be 10 μm or less in consideration of a size and capacitance of the body 110, and may be 0.6 μm or less for miniaturization and implementation of high capacitance of the multilayer ceramic electronic component 100, more preferably 0.4 μm or less, but the present disclosure is not limited thereto. The average thickness of each of the internal electrodes 121 and 122 may be measured by scanning cross-section of the body 110 cut in the first and second directions with an SEM at a magnification of 10,000. More specifically, at multiple points of an internal electrode, for example, at 30 points equally spaced apart from each other in the first direction, the thickness thereof may be measured to measure an average value. When such average value measurement is performed on a plurality of internal electrodes, an average thickness of the internal electrode may be further generalized. Other methods and/or tools appreciated by one of ordinary skill in the art, even if not described in the present disclosure, may also be used.

The internal electrodes 121 and 122 may be formed by printing a conductive paste for internal electrodes including a conductive metal to a predetermined thickness on a ceramic green sheet, and then performing sintering thereon. A method for printing the conductive paste may include a screen-printing method, a gravure printing method, or the like, but the present disclosure is not limited thereto. Details of the conductive paste will be described below.

The external electrodes 131 and 132 may be disposed on the first and second surfaces 1 and 2 of the body 110 to extend to a portion of each of the third, fourth, fifth and sixth surfaces 3, 4, 5, and 6. The external electrodes 131 and 132 may include a first external electrode 131 and a second external electrode 132 respectively connected to the plurality of first internal electrodes 121 and the plurality of second internal electrodes 122.

The external electrodes 131 and 132 may be formed of any material as long as it has electrical conductivity, such as a metal, and further may have a multilayer structure. For example, the external electrodes 131 and 132 may include first electrode layers 131a and 132a disposed on the body 110 and including a conductive metal and glass, and second electrode layers 131b and 132b disposed on the first electrode layers 131a and 132a and including a conductive metal. In this case, the first electrode layers 131a and 132a may be sintered electrodes.

The conductive metal included in the first electrode layers 131a and 132a may include copper (Cu), nickel (Ni), palladium (Pd), platinum (Pt), gold (Au), silver (Ag), lead (Pb), and/or an alloy including the same, and may preferably include copper (Cu) and/or nickel (Ni), but the present disclosure is not limited thereto.

The first electrode layers 131a and 132a may be formed by dipping the first and second surfaces 1 and 2 of the body 110 into a conductive paste for external electrodes including a conductive metal and glass, and then performing sintering thereon. Alternatively, the first electrode layers 131a and 132a may be formed by transferring a sheet including a conductive metal and glass.

The second electrode layers 131b and 132b may improve mounting properties. A type of the second electrode layers 131b and 132b is not particularly limited, and may be plating layers including nickel (Ni), tin (Sn), palladium (Pd), and/or an alloy including the same, and may be formed of a plurality of layers. The second electrode layers 131b and 132b may be, for example, nickel (Ni) plating layers or tin (Sn) plating layers, or may have a form in which a nickel (Ni) plating layer and a tin (Sn) plating layer are sequentially formed.

In the drawings, a structure in which the multilayer ceramic electronic component 100 has two external electrodes 131 and 132 is described, but the present disclosure is not limited thereto, and the number, shapes, or the like of the external electrodes 131 and 132 may vary depending on the shapes of the internal electrodes 121 and 122 or other purposes.

Hereinafter, a conductive paste for internal electrodes forming an internal electrode of a multilayer ceramic electronic component and an internal electrode according to an example embodiment of the present disclosure will be described in detail.

The conductive paste for internal electrodes may include a metal powder particle 21 and an ITO powder particle 23. As described below, the conductive paste for internal electrodes may include the ITO powder particle 23, and thus the multilayer ceramic electronic component 100 may have increased insulation resistance and improved high-temperature reliability.

A type of the metal powder particle 21 included in the conductive paste for internal electrodes is not particularly limited, and for example, may include one or more of nickel (Ni), copper (Cu), palladium (Pd), silver (Ag), gold (Au), platinum (Pt), tungsten (W), titanium (Ti), and an alloy thereof. Based on the metals present in the metal powder particle 21, the metal powder particle 21 may include a highest percentage (at %) of nickel (Ni). In this case, an average particle size D50 of the metal powder particle 21 may be 150 to 300 nm, but the present disclosure is not limited thereto. The average particle size of the metal powder particle 21 may be measured through various methods such as a diameter measurement method, an ASTM grain size test method, and the like.

The ITO powder particle 23 may refer to an indium tin oxide powder particle, and ITO may be a ceramic oxide used as a transparent electrode material in a display panel such as a touch screen. In the ITO, indium oxide and tin oxide may be mixed in a predetermined weight ratio. For example, the ITO may include 90 wt % of indium oxide ($In_2O_3$) and 10 wt % of tin oxide ($SnO_2$), but the present disclosure is not limited thereto.

Figure 5:
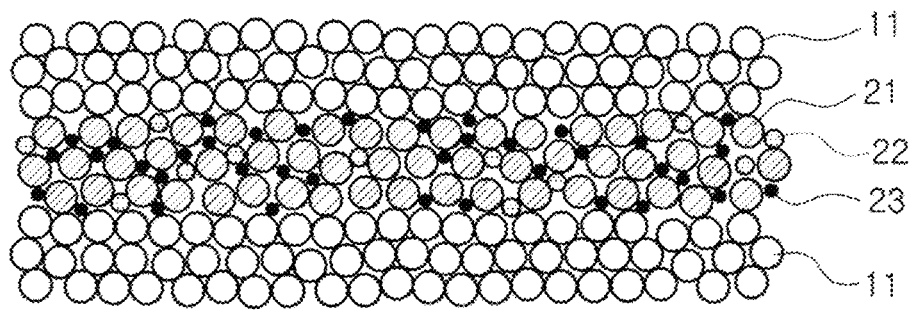
FIGS. 5 and 6 are schematic diagrams illustrating sintering shrinkage behavior of a conductive paste for internal electrodes forming an internal electrode of a multilayer ceramic electronic component.
Figure 6:
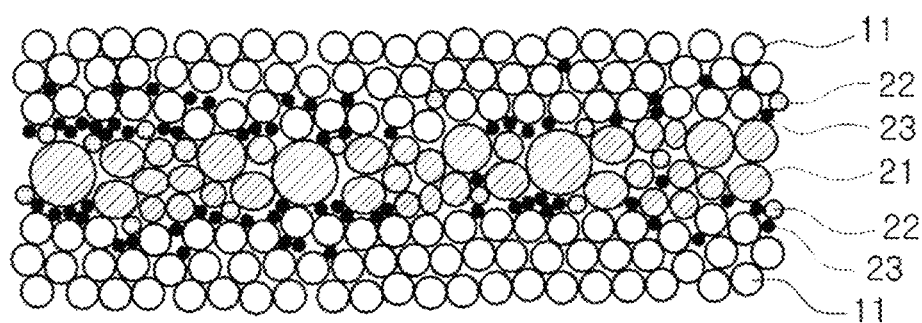

FIGS. 5 and 6 are schematic diagrams illustrating sintering shrinkage behavior of a conductive paste for internal electrodes forming an internal electrode of a multilayer ceramic electronic component.

Referring to FIGS. 5 and 6, the ITO powder particle 23 included in the conductive paste for internal electrodes may be uniformly dispersed together with the metal powder particle 21 at an initial stage of a sintering process. Thereafter, the ITO powder particle 23 may be diffused toward a ceramic powder particle 11 forming a dielectric layer, as illustrated in FIG. 6. In particular, with a rise in temperature, the ITO powder particle 23 may be diffused into a region between the metal powder particle 21 forming an internal electrode and the ceramic powder particle 11 forming the dielectric layer 111. Accordingly, insulation resistance at an interface between the internal electrodes 121 and 122 and the dielectric layer 111 after sintering may be improved, and leakage current may be blocked, thereby improving reliability of the multilayer ceramic electronic component 100.

A content of the ITO powder particle 23 included in the conductive paste for internal electrodes may be 0.33 mol or less relative to 100 mol of the metal powder particle 21. By satisfying the above-described condition, insulation resistance and high-temperature reliability of the multilayer ceramic electronic component 100 may be improved. When the content of the ITO powder particle 23 is greater than 0.33 mol relative to 100 mol of the metal powder particle 21, the multilayer ceramic electronic component 100 may have excessively reduced capacitance. A lower limit value of the content of the ITO powder particle 23 is not particularly limited, and may be greater than 0.

The average particle size D50 of the ITO powder particle 23 may be 10 to 50 nm. Accordingly, in the sintering process, the ITO powder particle 23 may be easily diffused into the region between the metal powder particle 21 of the conductive paste for internal electrodes and the ceramic powder particle 11 forming the dielectric layer 111. Accordingly, insulation resistance and high-temperature reliability of the multilayer ceramic electronic component 100 may be improved. The average particle size D50 of the ITO powder particle 23 may be measured through various methods such as a diameter measurement method, an ASTM grain size test method, and the like.

The conductive paste for internal electrodes may further include a ceramic powder particle 22. The conductive paste for internal electrodes may include the ceramic powder particle 22, and thus may suppress the onset of shrinkage of the metal powder particle 21, thereby controlling grain growth of the metal powder particle 21 and improving connectivity of the internal electrodes 121 and 122. In this case, the ceramic powder particle 22 may include an $ABO_3$-based powder particle. Here, "A" may be at least one of Ba, Sr, and Ca, and "B" may be at least one of Ti, Hf, and Zr. In addition, the conductive paste for internal electrodes may include a dispersant, a binder, a solvent, and the like, but the present disclosure is not limited thereto.

As described above, the conductive paste for internal electrodes may include an ITO powder particle 23. In addition, in a process in which the conductive paste for internal electrodes is sintered to form the internal electrodes 121 and 122, the ITO powder particle 23 may be diffused toward an interface between the metal powder particle 21 forming an internal electrode and the ceramic powder particle 11 forming the dielectric layer 111.

In the multilayer ceramic electronic component 100 according to an example embodiment of the present disclosure, an average content of indium (In) included in the internal electrodes 121 and 122 may be higher than an average content of tin (Sn) included in the internal electrodes 121 and 122. Here, the average contents of indium (In) and tin (Sn) may refer to an average value measured by measuring contents of indium (In) and tin (Sn) of the internal electrodes 121 and 122 at five points evenly spaced apart from each other in a thickness direction of the internal electrodes 121 and 122 in a cross-section of the body 110 cut in the first direction and the second direction or a cross-section of the body 100 cut in the second direction and third direction. As described below, the contents of indium (In) and tin (Sn) may be measured through a TEM-EDS line profile. Other methods and/or tools appreciated by one of ordinary skill in the art, even if not described in the present disclosure, may also be used.

The average content of indium (In) included in the internal electrodes 121 and 122 may be higher than the average content of tin (Sn) included in the internal electrodes 121 and 122 because the ITO powder particle 23 included in the conductive paste for internal electrodes includes, for example, 90 wt % of indium oxide ($In_2O_3$) and 10 wt % of tin oxide ($SnO_2$). A portion of indium (In) and tin (Sn) may exist in an elemental state as the ITO is reduced in the sintering process, and the portion of indium (In) and tin (Sn) may exist in the form of indium (In) oxide and tin (Sn) oxide. That is, the internal electrodes 121 and 122 may include indium tin oxide (ITO) that is not reduced in the sintering process.

In the multilayer ceramic electronic component 100 according to an example embodiment of the present disclosure, the internal electrodes 121 and 122 may include indium (In) and tin (Sn), and the average content of indium (In) included in the internal electrodes 121 and 122 may be higher than the average content of tin (Sn) included in the internal electrodes 121 and 122. Thus, the multilayer ceramic electronic component 100 may have excellent high-temperature reliability and insulation resistance.

In an example embodiment, the dielectric layer 111 may include indium (In) and tin (Sn). In a process of forming the body 110 by stacking and sintering multiple ceramic green sheets coated with the conductive paste for internal electrodes including the ITO powder particle 23, indium (In) and tin (Sn) may be diffused toward the dielectric layer 111. Accordingly, indium (In) and tin (Sn) may be distributed throughout the body 110 including the dielectric layer 111 and the internal electrodes 121 and 122, thereby improving the high-temperature reliability and insulation resistance of the multilayer ceramic electronic component 100.

In an example embodiment, a content of indium (In) in a region of the internal electrodes 121 and 122 within 2 nm of an interface with the dielectric layer 111 in the thickness direction thereof may be 0.6 at % to 1.0 at %. In addition, in an example embodiment, a content of tin (Sn) in the region of the internal electrodes 121 and 122 within 2 nm of the interface with the dielectric layer 111 in the thickness direction thereof 111 may be 0.4 at % to 0.6 at %. When the above-described condition is satisfied, the multilayer ceramic electronic component 100 may have improved high-temperature reliability and insulation resistance. The at % disclosed herein may be based on the total at % of indium (In), tin (Sn), oxygen (O), and the elements present in the metal powder particle 21 (e.g., nickel (Ni)).

When the content of indium (In) in the region of the internal electrodes 121 and 122 within 2 nm of the interface with the dielectric layer 111 in the thickness direction thereof is less than 0.6 at %, or the content of tin (Sn) in the region of the internal electrodes 121 and 122 within 2 nm of the interface with the dielectric layer 111 in the thickness direction thereof is less than 0.4 at %, the effect of improving the high temperature reliability and insulation resistance may be insignificant. In addition, when the content of indium (In) in the region of the internal electrodes 121 and 122 within 2 nm of the interface with the dielectric layer 111 in the thickness direction thereof is greater than 1.0 at %, or the content of tin (Sn) in the region of the internal electrodes 121 and 122 within 2 nm of the interface with the dielectric layer 111 in the thickness direction thereof is greater than 0.6 at %, the multilayer ceramic electronic component 100 may have excessively reduced capacitance.

The multilayer ceramic electronic component 100 according to another example embodiment of the present disclosure may include the body 110 including the dielectric layer 111, and the plurality of internal electrodes 121 and 122 stacked with the dielectric layer 111 interposed therebetween and including indium (In) and tin (Sn), and the external electrodes 131 and 132 disposed on an outside of the body 110. A content of indium (In) in a region (first region) of the internal electrodes 121 and 122 within 2 nm of an interface with the dielectric layer 111 in a thickness direction thereof may be higher than an average content of indium (In) in a region (second region) other than the region of internal electrodes 121 and 122 within 2 nm of the interface with the dielectric layer 111 in the thickness direction thereof. A content of tin (Sn) in the region (first region) of the internal electrodes 121 and 122 within 2 nm of the interface with the dielectric layer 111 in the thickness direction thereof may be higher than an average content of tin (Sn) in the region (second region) other than the region of internal electrodes 121 and 122 within 2 nm of the interface with the dielectric layer 111 in the thickness direction thereof.

More specifically, a region of internal electrode other than the region may refer to a region excluding the region of the internal electrodes 121 and 122 within 2 nm of the interface with the dielectric layer 111 in the thickness direction thereof. In addition, average contents of indium (In) and tin (Sn) may respectively refer to average values measured by measuring contents of indium (In) and tin (Sn) at five points evenly spaced apart from each other in the thickness direction of the internal electrodes 121 and 122 in a region other than the region of the internal electrodes 121 and 122 within 2 nm of the interface with the dielectric layer 111 in the thickness direction thereof. That is, the internal electrodes 121 and 122 include indium (In) and tin (Sn), and higher percentages of indium (In) and tin (Sn) may exist in a region adjacent to the interface with the dielectric layer 111 than in a central region in the thickness direction of the internal electrodes 121 and 122, thereby blocking leakage current, improving insulation resistance, and improving high-temperature reliability of the multilayer ceramic electronic component 100.

As described above, as the ITO powder particle 23 included in the conductive paste for internal electrodes is diffused toward the ceramic powder particle 11 forming the dielectric layer 111, the dielectric layer 111 after sintering may also include indium (In) and tin (Sn).

Accordingly, in an example embodiment, a content of indium (In) in a region (third region) of the dielectric layer 111 within 2 nm of an interface with the internal electrodes 121 and 122 in a thickness direction thereof may be higher than an average content of indium (In) in a region (fourth region) other than the region of the dielectric layer 111 within 2 nm of the interface with the internal electrodes 121 and 122 in the thickness direction thereof. In addition, in an example embodiment, a content of tin (Sn) in the region (third region) of the dielectric layer 111 within 2 nm of the interface with the internal electrodes 121 and 122 in the thickness direction thereof may be higher than an average content of tin (Sn) in the region (fourth region) other than the region of the dielectric layer 111 within 2 nm of the interface with the internal electrodes 121 and 122 in the thickness direction thereof.

That is, the dielectric layer 111 may include indium (In) and tin (Sn) by diffusion, and higher percentages of indium (In) and tin (Sn) may exist in a region adjacent to the interface with the internal electrodes 121 and 122 than in a central region in the thickness direction of the dielectric layer 111, thereby blocking leakage current, improving insulation resistance, and improving high-temperature reliability of the multilayer ceramic electronic component 100.

As described above, average contents of indium (In) and tin (Sn) in a region other than the region of the dielectric layer 111 within 2 nm of the interface with the internal electrodes 121 and 122 in the thickness direction thereof may respectively refer to average values measured by measuring contents of indium (In) and tin (Sn) at five points evenly spaced apart from each other in the thickness direction of the dielectric layer 111 in a region other than the region of the dielectric layer 111 within 2 nm of the interface with the internal electrodes 121 and 122 in the thickness direction thereof.

EXAMPLES

Hereinafter, the present disclosure will be described in more detail through Examples and Comparative Examples. The Examples are merely intended to assist in specific understanding of the present disclosure, and the scope of the present disclosure is not limited by the Examples.

First, a ceramic slurry including barium titanate ($BaTiO_3$) powder, a main component, was prepared, and then the prepared ceramic slurry was coated on a carrier film in the form of a sheet having a thickness of several μm by a doctor blade method, and then was dried to prepare a ceramic green sheet.

Next, after a conductive paste for internal electrodes including nickel (Ni) powder and ITO powder was prepared, the conductive paste for internal electrodes was coated on the ceramic green sheet by a screen-printing method to form an internal electrode pattern. In this case, 0.22 mol of the ITO powder was added relative to 100 mol of the nickel (Ni) powder. Thereafter, the ceramic green sheet on which the internal electrode pattern was formed was stacked to forma ceramic stack, and the stack was compressed and cut to have an individual component unit size.

Thereafter, the cut stack was heated in a nitrogen atmosphere at 400° C. or lower to remove a binder, and then was sintered under conditions of a sintering temperature of 1200° C. or lower and a hydrogen concentration of 0.5% $H_2$ or lower to prepare the body 110 including the dielectric layer 111 and the internal electrodes 121 and 122. Next, the sintered body was dipped into a conductive paste for external electrodes including copper (Cu) and glass, and then external electrodes 131 and 132 were formed through electrode sintering, thereby completing a sample chip. In this case, the sample chip was prepared to have a size of 2012 (length×width, 2.0 mm×1.2 mm).

<Measurement of Contents of Indium (In) and Tin (Sn)>

The completed sample chip was polished up to a point where a length of the body 110 in a first direction is half, and then the internal electrodes 121 and 122 and the dielectric layer 111 in a region adjacent to a point where a length of the body 110 in a second direction and a length of the body 110 in a third direction are respectively half in a cross-section of the body 110 in the second direction and the third direction, that is, a central region of the body 110, were photographed through a transmission electron microscope (TEM). Thereafter, a TEM image was analyzed through an EDS line profile in a thickness direction of the internal electrodes 121 and 122 and the dielectric layer 111 to measure contents of indium (In) and tin (Sn).

Figure 7A:
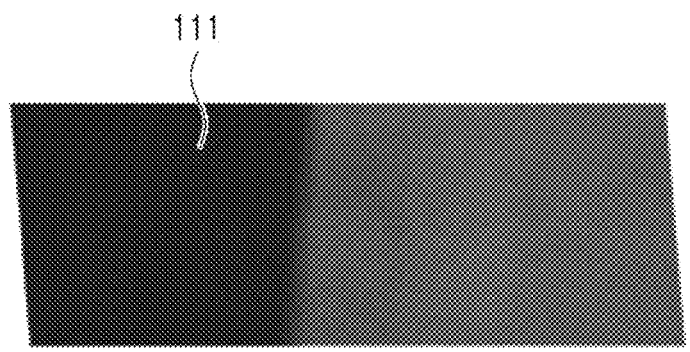
FIG. 7A is a transmission electron microscope (TEM) image of an interface between a dielectric layer and an internal electrode.
Figure 7B:
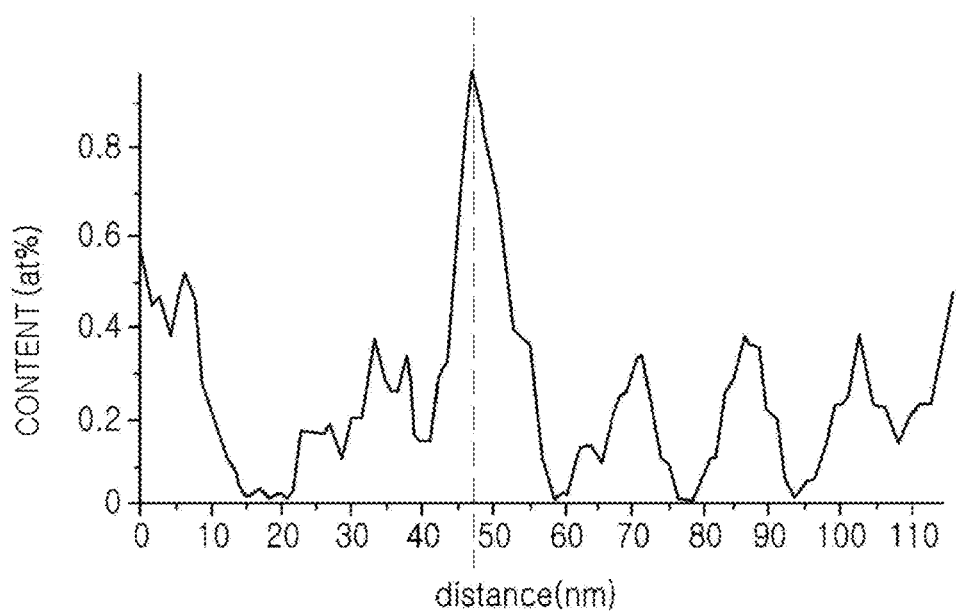
FIG. 7B is a TEM-EDS line profile analysis graph illustrating a content of indium (In)
Figure 8A:
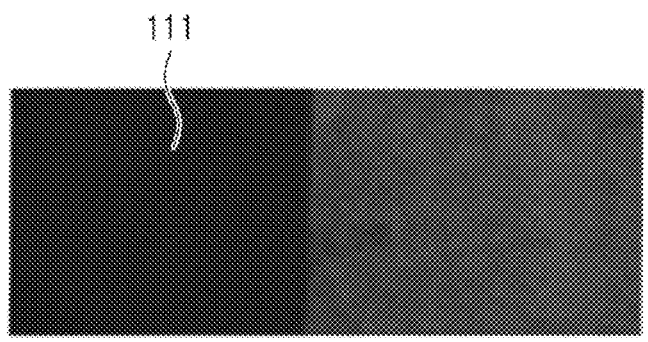
FIG. 8A is a TEM image of an interface between a dielectric layer and an internal electrode.
Figure 8B:
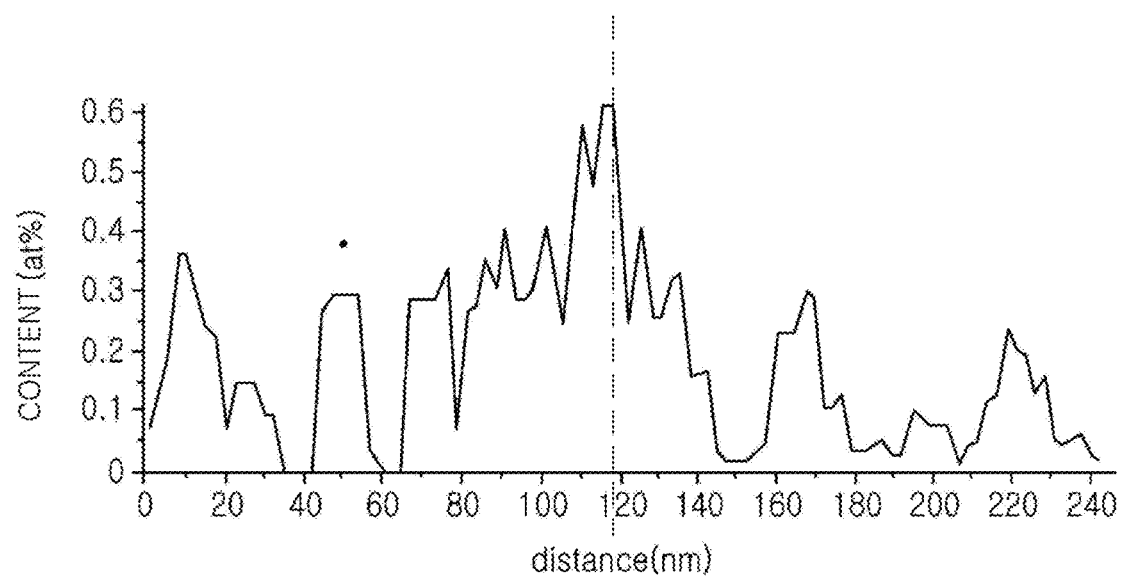
FIG. 8B is a TEM-EDS line profile analysis graph illustrating a content of tin (Sn)

FIG. 7A is a TEM image of an interface between a dielectric layer and an internal electrode, and FIG. 7B is a TEM-EDS line profile analysis graph illustrating a content of indium (In). FIG. 8A is a TEM image of an interface between a dielectric layer and an internal electrode, and FIG. 8B is a TEM-EDS line profile analysis graph illustrating a content of tin (Sn). In this case, regions brighter than the dielectric layer 111 are the internal electrodes 121 and 122, and a dotted line on the TEM-EDS line profile analysis graph represents an interface between the dielectric layer 111 and the internal electrodes 121 and 122.

Referring to FIGS. 7 and 8, it can be seen that an average content of indium (In) included in the internal electrodes 121 and 122 was higher than an average content of tin (Sn) included in the internal electrodes 121 and 122. In addition, it can be seen that a content of indium (In) in a region of the internal electrodes 121 and 122 within 2 nm of the interface with the dielectric layer in the thickness direction thereof was 0.6 at % to 1 at %, and that a content of tin (Sn) in the region of the internal electrodes 121 and 122 within 2 nm of the interface with the dielectric layer in the thickness direction thereof was 0.4 at % to 0.6 at %.

In addition, it can be seen that the contents of indium (In) and tin (Sn) in the region of the internal electrodes 121 and 122 within 2 nm of the interface with the dielectric layer in the thickness direction thereof were higher than average contents of indium (In) and tin (Sn) in a region other than the region of the internal electrodes 121 and 122 within 2 nm of the interface with the dielectric layer in the thickness direction thereof. The average contents of indium (In) and tin (Sn) are, respectively, average values measured by measuring contents of indium (In) and tin (Sn) at five points evenly spaced apart from each other in the thickness direction of the internal electrodes 121 and 122 in a region other than the region of the internal electrodes 121 and 122 within 2 nm of the interface with the dielectric layer 111 in the thickness direction thereof.

Similarly, through FIGS. 7 and 8, it can be seen that contents of indium (In) and tin (Sn) in a region of the dielectric layer 111 within 2 nm of an interface with the internal electrode 121 and 122 in a thickness direction thereof were respectively higher than average contents of indium (In) and tin (Sn) in a region other than the region of the dielectric layer 111 within 2 nm of the interface with the internal electrode 121 and 122 in the thickness direction thereof. As described above, the average contents of indium (In) and tin (Sn) included in the dielectric layer 111 are, respectively, average values measured by measuring contents of indium (In) and tin (Sn) at five points evenly spaced apart from each other in the thickness direction of the dielectric layer 111 in a region other than the region of the dielectric layer 111 within 2 nm of the interface with the internal electrode 121 and 122 in the thickness direction thereof.

Figure 9A:
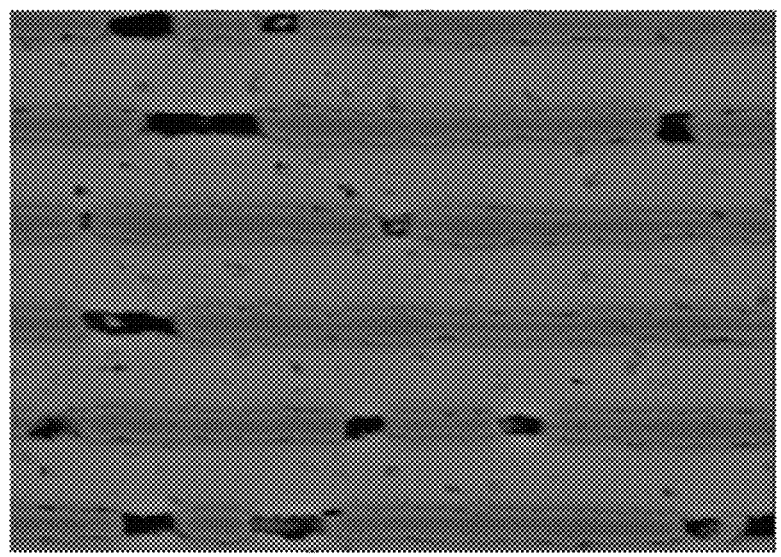
FIG. 9A is a scanning electron microscope (SEM) image of a dielectric layer and an internal electrode.
Figure 9B:
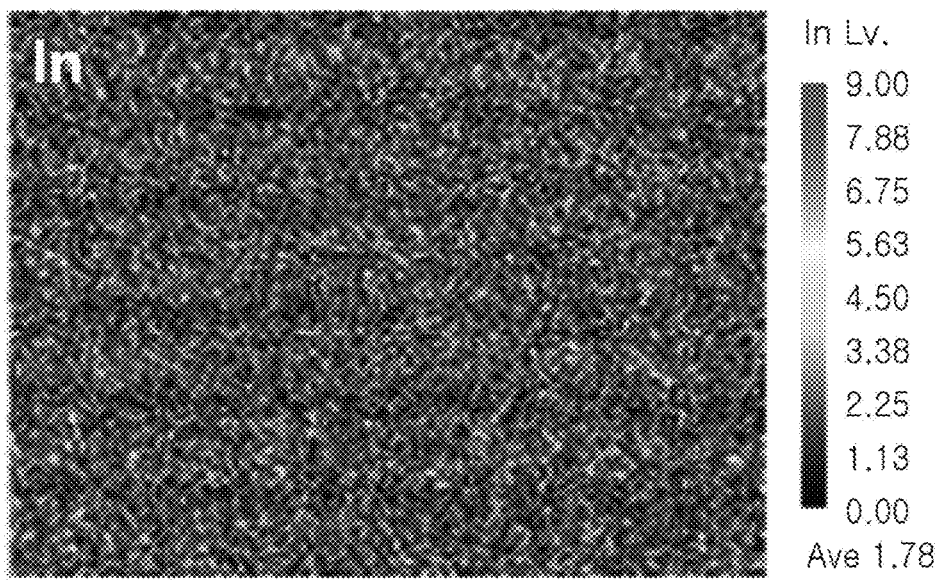
FIG. 9B is an image illustrating detection intensity of indium (In) measured through electron probe micro analysis (EPMA) performed on the SEM image of FIG. 9A.
Figure 9C:
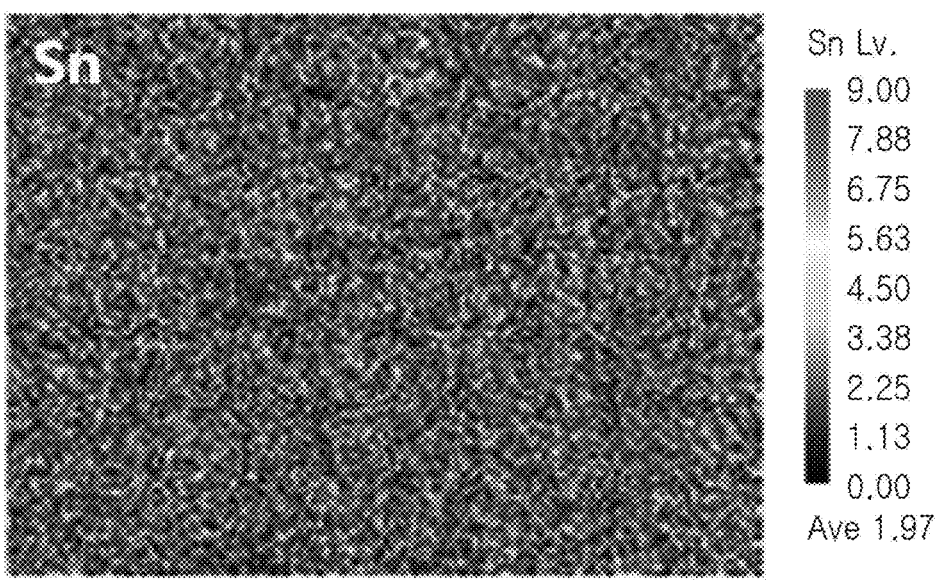
FIG. 9C is an image illustrating detection intensity of tin (Sn) measured through EPMA performed on the SEM image of FIG. 9A.

FIG. 9A is an SEM image of a dielectric layer and an internal electrode. More specifically, FIG. 9A is an image of a cross-section of the body 110 in a first direction and a second direction scanned at a magnification of 5,000. FIG. 9B is an image illustrating detection intensity of indium (In) measured through electron probe micro analysis (EPMA) performed on the SEM image of FIG. 9A. FIG. 9C is an image illustrating detection intensity of tin (Sn) measured through EPMA performed on the SEM image of FIG. 9A.

Referring to FIGS. 9A to 9C, it can be seen that indium (In) and tin (Sn) were distributed throughout the dielectric layer 111 and the internal electrodes 121 and 122. In addition, it can be seen that higher percentages of indium (In) and tin (Sn) were distributed in a region adjacent to an interface with the dielectric layer 111 among the internal electrodes 121 and 122 than in a central region in a thickness direction of the internal electrodes 121 and 122. Accordingly, the multilayer ceramic electronic component 100 may have improved insulation resistance and high-temperature reliability.

<Measurement of MTTF and Capacitance>

First, 80 sample chips according to a Comparative Example in which a conductive paste for internal electrodes does not include ITO powder and 80 sample chips according to an Example in which a conductive paste for internal electrodes includes ITO powder having a content of 0.22 mol relative to 100 mol of nickel (Ni) powder were prepared, respectively. That is, the Comparative Example includes an internal electrode not including indium (In) and tin, and the Example includes an internal electrode including indium (In) and tin (Sn). Thereafter, 40 sample chips according to the Comparative Example and 40 sample chips according to the Example were mounted on two substrates for measuring HALT, respectively, and then subjected to a severe reliability test (HALT) for 12 hours under a condition of applying 87.5V (DC) at 150° C. to measure a mean time to failure (MTTF) and an initial time to failure (B 0.43).

In addition, capacitances and dissipation factors (DF) of 80 sample chips in each of the Comparative Example and Example were measured under conditions of 1 kHz and AC 0.5V/μm using an LCR meter, and then average values thereof were measured and indicated in Table 1.

TABLE 1

| Comparison | Content of ITO powder (mol/100 mol of Ni) | MTTF | B 0.43 | Capacitance (μF) | DF |
|---|---|---|---|---|---|
| Comparative Example | 0 | 48.47 | 0.94 | 11.48 | 7.2 |
| Example | 0.22 | 152.07 | 14.31 | 11.31 | 6.7 |

Referring to Table 1, it can be seen that the Example including the internal electrode including indium (In) and tin (Sn) exhibited the excellent MTTF and initial failure time. Conversely, it can be seen that the Comparative Example not including indium (In) and tin (Sn) exhibited the MTTF and initial failure time lower than those of the Example.

While example embodiments have been shown and described above, it will be apparent to those skilled in the art that modifications and variations could be made without departing from the scope of the present disclosure as defined by the appended claims.

What is claimed is:

1. A multilayer ceramic electronic component comprising:
a body including a dielectric layer and internal electrodes stacked with the dielectric layer interposed therebetween, the internal electrodes including indium (In) and tin (Sn); and
an external electrode disposed on an outside of the body,
wherein an average content of indium (In) included in at least one of the internal electrodes is higher than an average content of tin (Sn) included in the at least one of the internal electrodes.

2. The multilayer ceramic electronic component of claim 1, wherein a content of indium (In) in a region of at least one of the internal electrodes within 2 nm of an interface with the dielectric layer in a thickness direction thereof is 0.6 at % to 1 at %.

3. The multilayer ceramic electronic component of claim 1, wherein a content of tin (Sn) in a region of at least one of the internal electrodes within 2 nm of an interface with the dielectric layer in a thickness direction thereof is 0.4 at % to 0.6 at %.

4. The multilayer ceramic electronic component of claim 1, wherein the dielectric layer includes indium (In) and tin (Sn).

5. The multilayer ceramic electronic component of claim 1, wherein the at least one of the internal electrodes further includes a highest at % of nickel (Ni).

6. The multilayer ceramic electronic component of claim 1, wherein the at least one of the internal electrodes includes indium tin oxide (ITO).

7. The multilayer ceramic electronic component of claim 1, wherein an average thickness of the at least one of the internal electrodes is 0.4 μm or less.

8. The multilayer ceramic electronic component of claim 1, wherein an average thickness of the dielectric layer is 0.4 μm or less.

9. The multilayer ceramic electronic component of claim 1, wherein the at least one of the internal electrodes further includes nickel (Ni).

10. The multilayer ceramic electronic component of claim 9, wherein an average content of nickel (Ni) included in the at least one of the internal electrodes is higher than the average content of indium (In) included in the at least one of the internal electrodes.

11. The multilayer ceramic electronic component of claim 10, wherein an average content of nickel (Ni) included in the at least one of the internal electrodes is higher than the average content of tin (Sn) included in the at least one of the internal electrodes.

12. The multilayer ceramic electronic component of claim 9, wherein the at least one of the internal electrodes includes indium tin oxide (ITO).

13. A multilayer ceramic electronic component comprising: a body including a dielectric layer and internal electrodes stacked with the dielectric layer interposed therebetween, the internal electrodes including indium (In) and tin (Sn); and an external electrode disposed on an outside of the body, wherein a content of indium (In) in a first region of at least one of the internal electrodes is higher than an average content of indium (In) in a second region of the at least one of the internal electrodes, where the first region is within 2 nm of an interface with the dielectric layer in a thickness direction thereof, and the second region is a region other than the first region, and a content of tin (Sn) in the first region is higher than an average content of tin (Sn) in the second region, and wherein the at least one of the internal electrodes further includes nickel (Ni) at a highest at %, based on metals present in the at least one of the internal electrodes.

14. The multilayer ceramic electronic component of claim 13, wherein a content of indium (In) in a third region of the dielectric layer is higher than an average content of indium (In) in a fourth region of the dielectric layer, where the third region is a region within 2 nm of the interface in the thickness direction, and the fourth region is a region other than the third region.

15. The multilayer ceramic electronic component of claim 13, wherein a content of tin (Sn) in a third region of the dielectric layer is higher than an average content of tin (Sn) in a fourth region of the dielectric layer, where the third region is a region within 2 nm of the interface in the thickness direction, and the fourth region is a region other than the third region.

16. The multilayer ceramic electronic component of claim 13, wherein a content of indium (In) in the first region is 0.6 at % to 1 at %.

17. The multilayer ceramic electronic component of claim 13, wherein a content of tin (Sn) in the first region is 0.4 at % to 0.6 at %.

18. The multilayer ceramic electronic component of claim 13, wherein an average content of nickel (Ni) included in the at least one of the internal electrodes is higher than the average content of indium (In) included in the at least one of the internal electrodes.

19. The multilayer ceramic electronic component of claim 18, wherein an average content of nickel (Ni) included in the at least one of the internal electrodes is higher than the average content of tin (Sn) included in the at least one of the internal electrodes.

* * * * *